(12) United States Patent
Gromelski et al.

(10) Patent No.: US 7,235,505 B2
(45) Date of Patent: *Jun. 26, 2007

(54) CARBIDE AND NITRIDE TERNARY CERAMIC GLOVE AND CONDOM FORMERS

(75) Inventors: Stanley J. Gromelski, Canton, OH (US); Paul Cacioli, Elthan South (AU); Richard L. Cox, Massillon, OH (US)

(73) Assignee: Ansell Healthcare Products LLC, Red Bank, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/535,129

(22) Filed: Sep. 26, 2006

(65) Prior Publication Data

US 2007/0021290 A1 Jan. 25, 2007

Related U.S. Application Data

(62) Division of application No. 10/498,172, filed as application No. PCT/US02/40113 on Dec. 16, 2002, now Pat. No. 7,157,393.

(60) Provisional application No. 60/341,892, filed on Dec. 18, 2001.

(51) Int. Cl.
*C04B 35/56* (2006.01)
*C04B 35/52* (2006.01)
*B28B 7/28* (2006.01)
*B28B 1/00* (2006.01)

(52) U.S. Cl. .......................... 501/87; 501/88; 501/91; 501/96.3; 264/636; 264/637; 264/651; 249/175

(58) Field of Classification Search ................ 501/87, 501/88, 91, 96.3; 264/636, 637, 651; 249/175
See application file for complete search history.

(56) References Cited

U.S. PATENT DOCUMENTS

| 4,888,829 A | 12/1989 | Kleinerman et al. |
| 5,534,350 A | 7/1996 | Liou |
| 5,882,561 A | 3/1999 | Barsoum et al. |
| 5,925,310 A | 7/1999 | Nakayama et al. |
| 5,942,455 A | 8/1999 | Barsoum et al. |
| 6,231,969 B1 | 5/2001 | Knight et al. |
| 6,461,989 B1 | 10/2002 | El-Raghy et al. |
| 2004/0250334 A1 | 12/2004 | El-Raghy et al. |

*Primary Examiner*—Karl Group
(74) *Attorney, Agent, or Firm*—Diehl Servilla LLC; Glen M. Diehl; Karen M. Whitney

(57) ABSTRACT

A slip-cast article former containing ternary ceramics, particularly of carbide and nitride materials, having the formula $M_{n+1}AX_n$(MAX), where M is a transition metal, A is an element from Groups IA and IVA of the periodic table, X is nitrogen or carbon and n is 1, 2, or 3. The ternary ceramic article may be a glove or condom former. A process for making a ternary ceramic article employing a slip cast method.

21 Claims, No Drawings

CARBIDE AND NITRIDE TERNARY CERAMIC GLOVE AND CONDOM FORMERS

CROSS-REFERENCE TO RELATED APPLICATIONS

This application is a division of U.S. application Ser. No. 10/498,172, filed Nov. 8, 2004, now U.S. Pat. No. 7,157,393, which is a §371 national stage entry of International Application No. PCT/US02/40113, filed Dec. 16, 2002, which claims priority to U.S. Provisional Application Ser. No. 60/341,892, filed Dec. 18, 2001, the disclosures of which are hereby incorporated in their entirety by reference thereto.

FIELD OF THE INVENTION

The invention is directed to articles containing ternary ceramic material and a method of making the articles.

BACKGROUND OF THE INVENTION

Formers are rigid molds sized and shaped to define the dimensions of the finished products. Formers are employed in the manufacture of latex and synthetic polymer products, such as examination and surgical gloves and condoms. The formers are typically made of wood, ceramic, glass, porcelain, plastic, steel or aluminum and are dipped, usually fingers first in the case of a glove former, into a liquid latex bath, including admixed chemicals, where the latex adheres to the former. The glove or condom formers may be heated prior to beginning the dipping process. Glove and condom formers are usually pre-coated with a coagulant to gel the latex and to facilitate removal of the article from the former. Typical coagulants include calcium nitrate. Additional dips in latex baths that contain fillers may also be required. The latex is coagulated and the glove or condom is released from the former usually by peeling the glove or condom from the former. The articles may be removed from the former in water. The gloves or condoms may also go through leaching and washing cycles to remove residual chemicals before being stripped from the former. The finished articles are then removed from the former such that the outer layer from the former will be the innermost layer of the glove or condom. The articles may then be packaged and sterilized for shipping.

After repeated cycles of chemical dips, formers begin to degrade and must be replaced. As a benchmark for durability, porcelain formers remain in good condition for up to two weeks when exposed to a concentrated solution of potassium hydroxide.

Ternary ceramics are generally known to be hard or brittle and not suitable for use in the manufacture of machined parts. However, titanium silicon carbide $Ti_3SiC_2$ has been synthesized to result in a soft, machinable, strong and lightweight material. $Ti_3SiC_2$ is anomalously soft for carbide materials. Single-phase samples of the material were characterized for thermal stability and oxidation-resistance. Sample bars of $Ti_3SiC_2$ material were quenched in a pail of water from 1,400° C. and found to have a slightly increased strength after quenching. Samples of $Ti_3SiC_2$ materials are also surprisingly machinable. Ceramics are typically too brittle to be machined, however, after drilling through the initial hard crust of the $Ti_3SiC_2$ the samples were found to be nearly as machinable as graphite.

$Ti_3SiC_2$ has properties of both metals and ceramics. Like a metal, it is machinable, thermally and electrically conductive, resistant to thermal shock and plastic at elevated temperatures. Like a ceramic, it is refractory (i.e., has a decomposition temperature of greater than 2,000° C.), oxidation-resistant, stiff and lightweight (roughly 4.5 grams per cubic centimeter), its thermal expansion is relatively low, more like a ceramic than a metal.

In slip casting, sometimes called drain casting, a plaster of Paris mold is filled with a slip. Slip is a liquid containing a ceramic material in a water suspension. As the mold absorbs water, the ceramic suspension solidifies uniformly on the walls of the mold. Once the desired wall thickness is reached, the remaining slip is drained, the mold is separated or broken, and the part is removed. The part is then sintered in an oven.

WO 98/22244 describes a dense ceramic work piece made by pressing a combination of powdered $Ti_3SiC_2$ and a powdered material that is soluble in the $Ti_3SiC_2$ into a green body. The green body is then heated under pressureless sintering conditions to a temperature above a point at which a liquid is formed but below the melting point of the mixture. WO 98/22244 does not teach or disclose making hollow objects (like formers) with a plaster of Paris mold and a liquid dispersion of powdered $Ti_3SiC_2$.

Conventional formers that are typically made of wood, ceramic, glass, porcelain, plastic, steel or aluminum deteriorate after continual exposure to the heat and chemicals employed during the glove and condom making process. Deterioration causes pitting in the formers, and the gloves and condoms produced from the pitted formers have pin hole sized defects. There is a need, therefore, for glove and condom formers of a durable material that will reduce the frequency with which the formers must be replaced. It is desirable that the durable formers do not otherwise interfere with the quality of the glove or condom produced.

SUMMARY OF THE INVENTION

The invention is directed to an article, such as a former, containing a ternary ceramic material having a chemical formula of $M_{n+1}AX_n$, where M is an early transition metal, where A is an element selected from the group consisting of Group IIIA elements and Group IVA elements, where X is selected from a group consisting of carbon, nitrogen and combinations thereof, and where n is selected from a group consisting of 1, 2, and 3; a binder; and a viscosity modifier.

Unlike previous formers, embodiments of the present invention lead to a former made of a high strength, high temperature-stable material that withstands repeated chemical dips. Since the formers of the present invention are made with a more durable material than previous formers, the frequency with which the formers have to be replaced is greatly reduced.

The invention is also directed to a method of making an article, such as a former, that includes the following steps:
(a) Mixing a ternary ceramic powder, water, a binder, and a viscosity modifying agent to form a dispersion;
(b) Pouring the dispersion of step (a) into a plaster of Paris mold and allowing the dispersion in the plaster of Paris mold to set for about 30 minutes to about 5 hours;
(c) Pouring off any excess amount of the dispersion in the plaster of Paris mold;
(d) Allowing the dispersion in the plaster of Paris mold to air dry for about 1 hour to about 8 hours;
(e) Breaking open and remove the plaster of Paris mold from a former; and (f) Firing the former of step (e) in a furnace at a temperature from about 1000 to about 1500° C. for about 1 hour to about 8 hours.

DETAILED DESCRIPTION OF THE INVENTION

The articles of the present invention contain ternary ceramic material. The ternary ceramic material has a chemical formula of $M_{n+1}AX_n$, where M is an early transition metal, where A is an element selected from the group consisting of Group IIIA elements and Group IVA elements, where X is selected from a group consisting of carbon, nitrogen and combinations thereof, and where n is selected from a group consisting of 1, 2, and 3; a binder; and a viscosity modifier. Articles include, but are not limited to, formers such as glove and condom formers. The amount of the ternary ceramic material present in the article is about 100 weight %, based on the total weight of the article.

A preferred ternary ceramic material is $Ti_3SiC_2$. Two compounds similar to $Ti_3SiC_2$ have been identified and synthesized. These compounds are $Ti_3GeC_2$ and $Ti_3AlC_2$ where a single germanium or aluminum atom is substituted for silicon. These compounds ($Ti_3SiC_2$, $Ti_3GeC_2$ and $Ti_3AlC_2$) are referred to as "312" compounds for the number of atoms of each element in the compound, respectively.

Chemically related compounds have a "211" or "413" formula. The chemically-related 211 and 413 compounds are expected to have characteristics similar to the 312 compounds. The MAX phase ternary layered compounds are generally defined, then, by the formula of $M_{n+2}AX_n$, where M is an early transition metal, A is an A-group element appearing generally in Groups IIIA or IVA of the period table of chemical elements, X is carbon or nitrogen or both and n is 1, 2, or 3.

The 413 compounds include $Ti_4AN_3$, while the 211 compounds include the compounds of Table 1.

TABLE 1

"211" Compounds

| | | | | | |
|---|---|---|---|---|---|
| $Ti_2AlC$ | $Ti_2AlN$ | $Hf_2PbC$ | $Cr_2GaC$ | $V_2AsC$ | $Ti_2InN$ |
| $Nb_2AlC$ | $(Nb,Ti)_2AlC$ | $Ti_2AlN_{1/2}C_{1/2}$ | $Nb_2GaC$ | $Nb_2AsC$ | $Zr_2InN$ |
| $Ti_2GeC$ | $Cr_2AlC$ | $Zr_2SC$ | $Mo_2GaC$ | $Ti_2CdC$ | $Hf_2InN$ |
| $Zr_2SnC$ | $Ta_2AlC$ | $Ti_2SC$ | $Ta_2GaC$ | $Sc_2InC$ | $Hf_2SnN$ |
| $Hf_2SnC$ | $V_2AlC$ | $Nb_2SC$ | $Ti_2GaN$ | $Ti_2InC$ | $Ti_2TlC$ |
| $Ti_3SnC$ | $V_2PC$ | $Hf_2SC$ | $Cr_2GaN$ | $Zr_2InC$ | $Zr_2TlC$ |
| $Nb_2SnC$ | $Nb_2PC$ | $Ti_2GaC$ | $V_2GaN$ | $Nb_2InC$ | $Hf_2TlC$ |
| $Zr_2PbC$ | $Ti_2PbC$ | $V_2GaC$ | $V_2GeC$ | $Hf_2InC$ | $Zr_2TlN$ |

The articles of the present invention are made by a method referred to in the industry as "slip casting". A dispersion is formed by mixing a ternary ceramic powder, water, a binder and a viscosity modifying agent. A preferred ternary ceramic material is powdered $Ti_3SiC_2$, available as Maxthal from Kalntal AB of Sweden. The amount of the ternary ceramic powder ranges from about 15 to about 83 weight %, based on the total weight of the dispersion.

The amount of the water ranges from about 15 to about 75 weight %, based on the total weight of the dispersion.

The binder and viscosity modifier are cellulose-based materials. Suitable binders include, but are not limited to, cellulose powder, cellulose derivatives, and combinations thereof. The binders are present in an amount ranging from about 1 to about 20 weight %, preferably from about 5 to about 10 weight %, based on the total weight of the dispersion. Suitable viscosity modifiers include, but are not limited to, carboxymethylcellulose, polyacrylate acid polymers, and combinations thereof. The viscosity modifiers are present in an amount ranging from about 1 to about 5 weight %, preferably from about 1 to about 2 weight %, based on the total weight of the dispersion.

The dispersion may be from about 25 to about 85 weight % solids, preferably from about 80 to about 85 weight %, based on the total weight of the dispersion. The dispersion or slurry is referred to as the slip.

The dispersion is poured into a plaster of Paris (calcium sulfate hemihydrate) mold. The plaster of Paris mold conforms to the desired shape and size of the former. The dispersion is allowed to stand in the plaster of Paris mold for a time sufficient to allow the dispersion to coat the inside of the plaster of Paris mold. The amount of time that the dispersion is allowed to stand in the plaster of Paris mold is directly proportional to the desired thickness of the finished article. Accordingly, the longer the dispersion is allowed to stand in the plaster of Paris mold, the thicker the surfaces of the article.

The excess amount of dispersion is then poured off and the dispersion in the plaster of Paris mold is allowed to air dry for about 30 minutes to about 5 hours. The plaster of Paris mold is then broken open and removed from the article.

After the article is allowed to air dry for about to about 1 hour to about 8 hours, the article is fired in an oven at temperatures ranging from about 1000° C. to about 1500° C. This firing or heating is referred to as the sintering step. The article is fired for about 1 hour to about 8 hours. The firing burns off the water, the binders, and viscosity modifiers, leaving an article containing about 100% ternary ceramic material.

The following example describes a preferred embodiment to illustrate the invention. However, it is to be understood that the invention is not intended to be limited to the specific embodiment.

EXAMPLE 1

A ternary ceramic of $Ti_3SiC_2$ was slip cast and sintered to into a size medium examination glove former by dispersing 2355 grams $Ti_3SiC_2$ ceramic powder available as Maxthal of Kanthal AB of Sweden in 525 ml water along with 120 grams Cellulose QP, available from Union Carbide Corp., of Danbury, Conn. The slip was poured into a plaster of Paris mold and allowed to set for 15 minutes before the excess slip is drained. The former was removed from the mold and allowed to air dry for 1 hour. After drying, the former was heated in a non-continuous (batch) oven at temperatures up to 1400° C. for 15 hours.

A portion of the former was tested to determine the durability of the former. A sample portion of the former was weighed and immersed in a 20% solution of potassium hydroxide at 170° F. The sample was removed every 7 days, weighed, and placed back into the potassium hydroxide solution. The results are shown in Table 2.

TABLE 2

| Time (days) | Weight (grams) |
|---|---|
| 0 | 14.204 |
| 7 | 14.204 |
| 14 | 14.204 |
| 21 | 14.204 |
| 28 | 14.204 |

TABLE 2-continued

| Time (days) | Weight (grams) |
|---|---|
| 35 | 14.204 |
| 42 | 14.204 |
| 49 | 14.133 |

At the end of eight weeks the former began to show a slight loss in weight. Standard porcelain formers are known to degrade after two weeks of exposure to potassium hydroxide as evidenced by pitting in the former and by producing gloves that have pin hole sized defects in the gloves.

It should be understood that various changes and modifications to the embodiments described herein will be apparent to those skilled in the art. Such changes and modifications can be made without departing from the spirit and scope of the present invention and without demising the attendant advantages. It is, therefore, intended that such changes and modifications be covered by the appended claims.

All references, including publications, patent applications, and patents, cited herein are hereby incorporated by reference to the same extent as if each reference were individually and specifically indicated to be incorporated by reference and were set forth in its entirety herein.

What is claimed is:

1. A hollow slip-cast article comprising:
a ternary ceramic material having chemical formula of $M_{n+1}AX_n$, where M is a transition metal, where A is an element selected from the group consisting of Group IIIA elements, Group IVA elements, S, P, As, and Cd, where X is selected from the group consisting of carbon, nitrogen, and combinations thereof, and where n is selected from the group consisting of 1, 2, and 3.

2. The article of claim 1, wherein the transition metal is selected from the group consisting of Ti, Nb, Zr, Hf, Cr, Ta, V, Mo, and Sc.

3. The article of claim 1, wherein A is selected from the group consisting of Al, Ge, Sn, Pb, Ga, Tl, P, S, As, Cd, and In.

4. The article of claim 1 wherein the hollow slip cast article is in the shape of a hollow condom or glove former and being substantially resistant to pitting.

5. The article of claim 4 wherein the article is resistant to pitting after approximately two weeks of exposure to a 20% solution of potassium hydroxide at 170° F.

6. A method for forming a slip-cast article comprising:
preparing an aqueous dispersion of a ternary ceramic material having chemical formula of $M_{n+1}AX_n$, where M is a transition metal, where A is an element selected from the group consisting of Group IIIA elements, Group IVA elements, S, P, As, and Cd, where X is selected from the group consisting of carbon, nitrogen, and combinations thereof, and where n is selected from the group consisting of 1, 2, and 3;
introducing a quantity of the aqueous dispersion into a mold, the mold having a cavity therein with an interior surface defining a preselected hollow shape, to substantially fill the cavity;
allowing a layer of the ternary ceramic material to develop on the interior surface of the cavity;
removing an excess of aqueous dispersion from the cavity;
forming the slip-cast article from the layer of ternary ceramic material;
separating the mold and the slip-cast article;
drying the slip-cast article; and
sintering the slip-cast article.

7. The method of claim 6 comprising forming the slip-case article in the shape of a hollow condom or glove former wherein the article is substantially resistant to pitting.

8. The method of claim 7 wherein the article is resistant to pitting after approximately two weeks of exposure to a 20% solution of potassium hydroxide at 170° F.

9. The method of claim 6 wherein the preparing step further comprises selecting $Ti_3SiC_2$ as the ternary ceramic material.

10. The method of claim 6, wherein the transition metal is selected from the group consisting of Ti, Nb, Zr, Hf, Cr, Ta, V, Mo, and Sc.

11. The method of claim 6, wherein A is selected from the group consisting of Al, Ge, Sn, Pb, Ga, Tl, P, S, As, Cd, and In.

12. The method of claim 6 wherein the preparing step further comprises blending (w/w) between about 15 to about 83% of the ternary ceramic material, between about 1 to about 20% of a binder, and about 1 to about 5% of a viscosity modifier to form the aqueous dispersion.

13. The method of claim 12 wherein the preparing step further comprises selecting a binder from the group consisting of cellulose powder, derivatives of cellulose, and combinations thereof.

14. The method of claim 12 wherein the preparing step further comprises selecting a viscosity modifier from the group consisting of carboxymethylcellulose, polyacrylate acid polymer, and combinations thereof.

15. The method of claim 12 wherein the preparing step further comprises preparing an aqueous dispersion having a solids content from about 25 to about 85% solids.

16. The method of claim 15 wherein the preparing step further comprises preparing an aqueous dispersion having a solids content from about 80 to about 85% solids.

17. The method of claim 6 wherein the mold is formed from plaster of Paris.

18. The method of claim 6 wherein the step of drying further comprises air drying the article for from about ½ to about 5 hours.

19. The method of claim 6 wherein the step of sintering the ternary ceramic material further comprises firing the article in an oven for from about 1 hour to about 8 hours at a temperature from about 1,000 to about 1,500° C.

20. A condom or glove former made by the method of claim 6.

21. A condom or glove former made by the method of claim 8.

* * * * *